Aug. 12, 1969 P. W. CARSTEN 3,460,798
PILOT ACTUATED VALVE
Filed May 26, 1966
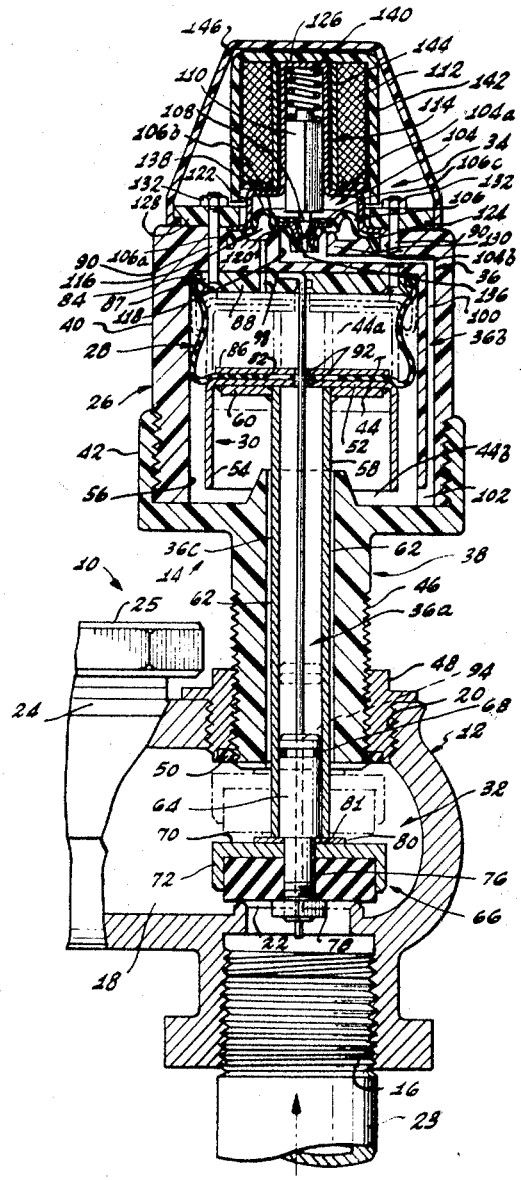
INVENTOR.
PAUL W. CARSTEN
BY Fulwider, Patton, Rieber
Lee, and Utecht
ATTORNEYS United States Patent Office 3,460,798
Patented Aug. 12, 1969

3,460,798
PILOT ACTUATED VALVE
Paul W. Carsten, Malibu, Calif., assignor to Aquamation Inc., Glendora, Calif., a corporation of California
Filed May 26, 1966, Ser. No. 553,258
Int. Cl. F16k 1/32, 31/06, 31/12
U.S. Cl. 251—30                                1 Claim

ABSTRACT OF THE DISCLOSURE

A valve assembly including a rolling diaphragm as a frictionless seal between a piston and inner walls of a piston supporting cylinder. Porting means are included in the valve assembly between opposite sides of the rolling diaphragm and upstream and downstream sides of the valve which are of successively larger cross-sectional area from upstream to downstream and operation of the valve assembly is controlled by a diaphragm actuated pilot valve regulating the flow of fluid through the porting means.

---

The present invention relates to improvements in valve constructions and, more particularly, to an improved valve assembly which is ideally suited to use in automatic lawn sprinkler systems and the like.

Valve assemblies presently used in automatic lawn sprinkler and similar systems generally include a hollow, metal cylinder connected to the top of a valve body in a water line. Either a piston or a flat diaphragm is mounted in the cylinder and designed to move toward and away from the valve body in response to the pressure differences thereacross. A valve disc is fixedly connected to one side of the diaphragm or piston and is adapted to seat on a valve seat around a fluid inlet to the valve body to thereby close the valve upon movement of the piston or diaphragm toward the inlet.

External to the cylinder and the valve body, the valve assembly includes a plurality of conduits. The conduits extend radially from the sides of the cylinder to a pilot valve and to the associated water line, to supply water to the cylinder. Operation of the pilot valve controls the flow of water to opposite sides of the piston or diaphragm, causing it to move within the cylinder and the valve disc to move on and off the valve seat, thereby closing and opening the valve.

The piston and diaphragm-type valves possess different, important advantages and disadvantages. In the piston-type valve, a piston is mounted for axial movement in the cylinder with a seal, such as an O-ring, connected to the periphery of the piston to slide in tight contact with and along the inner walls of the cylinder. The piston and associated valve disc are capable of a long stroke in the cylinder which may be of a relatively small diameter. Therefore, when the piston-type valve is open, fluid suffers a minimum pressure loss in flowing through the valve body. Also, the piston-type valve may be of a relatively compact radial design, ideally suited to use where space is a problem.

Unfortunately, as the piston valve operates debris and scale build up on the inner walls of the cylinder. The scale increases the friction between the O-ring and the inner wall of the cylinder in a non-uniform manner thereby producing variations in the rate of valve operation. Also, the scale damages the O-ring such that it does not seal properly against the inner wall of the cylinder thereby destroying proper valve operation and requiring the valve to be periodically inspected and serviced and the seals to be frequently replaced.

In the diaphragm-type valve, a generally flat diaphragm extends across the cylinder to define upper and lower compartments therein. The diaphragm is a long-lasting, frictionless, watertight seal between the upper and lower compartments and is movable without developing friction forces at the inner walls of the cylinder.

Unfortunately, in order for the diaphragm and associated valve disc to have a long stroke, the diaphragm must be very large. This correspondingly increases the over-all diameter of the valve assembly making it difficult to mount in some locations, and requires the use of special structure for mounting and supporting the diaphragm in both an open position and a closed position against the valve seat. In addition, diaphragm-type valves generally possess a nonuniform opening and closing characteristic. This is due to the fact that the force required to close the diaphragm against the valve seat varies with the position of the diaphragm within the cylinder along its stroke.

In view of the foregoing, it is a general object of the present invention to provide an improved valve assembly which possesses all the advantages of the piston and diaphragm-type valves without their accompanying disadvantages.

Another object of the present invention is to provide an improved, packless valve assembly having a linear closing force characteristic.

A further object of the present invention is to provide an improved valve of the foregoing character which has a small diameter cylinder and a movable member capable of a long stroke within the cylinder toward and away from a valve seat.

The foregoing as well as other objects and advantages of the present invention may be more clearly understood by reference to the following detailed description when considered with the drawing which, by way of example only, illustrates one form of valve assembly embodying the features of the present invention.

In the drawing, the valve assembly is represented generally by the numeral 10 and comprises a valve body 12 and a valve actuator 14. The valve body 12 is adapted for connection in a water line while the actuator 14 is controlled to open and close the valve. The actuator 14 is also manually adjustable relative to the body 12 to preset the rate of water flow through the valve as well as to manually close and open the valve as desired.

The valve body 12 is of conventional design and is formed of a metal casting having an internally threaded, bottom inlet port 16, a side outlet port 18, and an internally threaded top port 20 opposite the inlet port. An annular collar 22 extends inwardly from the inlet port 16 to define a valve seat within the valve body 12.

In the valve assembly 10, a pipe 23 is connected to the inlet port 16 to supply water to the valve assembly, and antisiphon valve 24 is connected to the outlet port 18 with a head 25 extending immediately adjacent the top port 20, while the top port is adapted to receive the valve actuator 14.

Generally speaking, the actuator 14 includes a cylinder 26, a rolling diaphragm 28, a piston 30, lower valve means 32, upper pilot valve means 34 and internal porting 36 within the cylinder from the upstream to downstream sides of the valve body 12. By selectively controlling the pilot valve means 34 to open and close the porting 36, vertical movement of the piston 28 within the cylinder 26 is controlled to move the valve means 32 against and away from the valve seat 22 and to thereby close and open the valve assembly 10.

More particularly, the cylinder 26 includes a base 38 and a cylindrical cap 40. A top portion 42 of the base 38 is generally cylindrical and internally threaded to tightly receive an externally threaded lower end portion of the cap member 40. Thus connected, the top portion 42 of the base and the cap 40 combine to define a crylindrical chamber 44 in the cylinder 26.

In addition to the top portion 42, the base 38 includes an externally threaded tubular stem portion 46 for screwing through the top port 20 in the valve body 12 toward and away from the valve seat 22. As will be described in detail hereinafter, the adjustability of the stem portion 46 through the top port 20 provides means for (1) limiting the travel of the valve means 32 within the valve body 12 to thereby regulate or preset the rate of water flow through the open valve, (2) manually closing the valve by forcing the valve means 32 against the valve seat 22, and (3) manually opening the valve assembly 10.

In the illustrated forms of the valve assembly 10, the stem portion 46 screws into and through an adapter ring 48. The adapter ring 48 in turn screws into the top port 20 to provide longitudinal support for the stem portion 46. A seal 50 is seated around the stem portion 46 within the adapter ring 48 to prevent fluid from leaking around the stem portion outside of the valve body 12. The use of different size adapter rings allows the valve actuator 14 to be readily installed in any size valve body 12 including those already in an existing water line when it is desired to convert a manually controlled water system to an electrically or hydraulically actuated system. In a like manner, the valve means 32 also may be selected for any size of valve seat 22 to insure a complete closure of the valve in any size valve body.

In the valve actuator 14, the piston 30 includes a generally flat top disc 52 having an annular flange 54 extending downwardly from its outer edge. The piston 30 is supported in the chamber 44 and spaced from the cylindrical inner wall 56 of the chamber by a tubular piston rod 58. The piston rod 58 is connected to the underside of the disc 52 and to a reinforcing washer 60 for the piston, extends downwardly through the stem portion 46, and is adapted to slide up and down within the stem with vertical movement of the piston 30 in the chamber 44. In this regard, the friction between the tubular piston rod 48 and the inner walls of the stem portion 46 is reduced to a minimum by utilizing a point contact support. As represented, the inner wall of the stem portion 46 includes a plurality of angularly spaced, longitudinally extending grooves 62 defining a plurality of short, arcuate shoulders for supporting the piston rod 58. As will be described in greater detail hereinafter, the grooves 62 also act as a continuously open port means between the underside of the position 30 and the downstream side of the valve body 12.

The lower end of the tubular piston rod 58 provides support for the valve means 32 which, in the illustrated form of the valve assembly 10, includes a rod 64 adapted for sliding movement in the lower end of the tubular rod 58, and a valve disc unit 66. An O-ring 68 extends around the rod 64 within the tubular piston rod 58 to prevent water from leaking around the rod 64 and into or from the piston rod. The valve disc unit 66 comprises a generally flat plate 70 having an annular, downwardly extending, flanged outer edge 72 defining a cup for tightly receiving a disc 74 of resilient material. The valve disc 66 also includes a central opening 76 for receiving the lower end of the rod 64. Thus positioned, the valve disc is secured to the rod 64 by a nut 78 which screws onto the lower end of the rod and presses the valve disc upwardly against a retaining washer 80 and an annular shoulder 81 on the rod.

Since the rod 64 is slidable within the tubular piston rod 58, the valve means 32 is movable to a limited extent independent of the piston rod and piston. As will be described hereinafter, this feature allows the valve means 32 to act as a check valve for preventing downstream pressure reversals from being reflected upstream.

As is commonly known, a rolling diaphragm is a generally cylindrical rubber member having one end of relatively small diameter and an opposite end of relatively large diameter. In the illustrated form of the valve actuator 14, the upper face of the piston 30 provides support for and closes the relatively small open end 82 of the rolling diaphragm 28 while the inner top wall of the chamber 44 closes the relatively large open end 84 of the rolling diaphragm.

In this respect, an annular portion of the outer surface of the rolling diaphragm 28 adjacent the small end 82 overlies the top disc 52 of the piston 30 and is sandwiched tightly between the top disc and a diaphragm retainer disc 86 connected to the top disc, as by welding. The large open end 84 of the rolling diaphragm 28 includes an annular bead captured in the upper corner of the chamber 44 between the top wall of the chamber and an annular, outwardly inclined shoulder 87 on a diaphragm bracket disc 88. The bracket disc 88 is secured to the top of the chamber 44 by a plurality of screw members 90 extending upwardly through the disc and the top of the cap 40.

In the foregoing manner, the ends of rolling diaphragm 28 are held tightly in place while the body of the rolling diaphragm is at all times supported by the inner side wall 56 of the chamber 44 and the outer surface of the annular flange 54 of the piston 30 as the piston 30 travels up and down within the chamber (observe phantom outline in FIGURE 1). The rolling diaphragm 28 thus provides a frictionless, watertight seal between the piston 30 and the inner wall 56, and divides the chamber 44 into upper and lower isolated compartments 44a and 44b. The rolling diaphragm 28 also permits the piston to have a long stroke within the chamber 44, which is of relatively small diameter. Since the piston has a relatively long stroke, the fluid passing through the open valve assembly 10 undergoes a minimum fluid pressure loss. Also, since the diameter of the cylinder 26 may be relatively small, the valve assembly 10 is ideally suited for use in locations where radial space is at a premium. In this regard, it should be noted that the use of the radially small stem portion 46 allows the valve actuator 14 to be utilized in close proximity to other valves, such as the siphon valve 24.

In the operation of the valve actuator 14, the rolling diaphragm 28 acts only as a seal and does not impart driving forces to the piston 30. In fact, it is only the fluid pressures acting on the top and bottom surfaces of the piston 30 which produce movement of the piston within the chamber 44, carrying the valve means 32 on and off of the valve seat 22. Since the area of the piston 30 does not vary and there is no friction contact between the piston and the inner walls of the chamber, the closing and opening force characteristics of the valve actuator are substantially linear and unvarying from one operation to the next.

From the foregoing, it is appreciated that the use of the rolling diaphragm 28 in the valve actuator 14 allows the valve actuator to possess all the advantages of a piston-type and diaphragm-type valve without any of their associated disadvantages. In this connection, however, care must be exercised to insure that the pressure in the upper compartment 44a always equals or exceeds the pressure in the lower compartment 44b, that is, that the rolling diaphragm 28 is not subjected to a pressure reversal. Under conditions of a pressure reversal, the rolling diaphragm 28 may tend to invert itself, become crimped, permanently damaged, and require replacement.

In the illustrated form of the valve actuator 14, the porting 36 functions to insure that the pressure in the upper compartment 44a never falls below the pressure in the compartment 44b, thereby protecting the rolling diaphragm 28 from undesired pressure reversals. The porting 36 comprises a first port means 36a between the upstream side of the valve body and the upper compartment 44a, second port means 36b between the upper compartment and the lower compartment, and third port means 36c between the lower compartment and the downstream side of the valve body 12.

The first port means 36a comprises the tubular piston rod 58, small aligned openings 92 in the diaphragm retainer disc 86, top disc 52 of the piston, and reinforcing washer 60, and a relatively small axial hole 94 through the rod 64. A metering rod 96 connected at its upper end to the bracket disc 88 extends longitudinally through the openings comprising the first port means 36a and controls the rate of water flow from the upstream side of the valve body into the upper compartment 44a. Upon vertical movement of the piston 30 and piston rod 48, the metering rod effectively cleans the aligned openings 92 and 94 of any debris or other foreign particles in the water tending to plug the openings.

The second port means 36b comprises aligned top holes 98 through the bracket disc 88 and top of the cap 40 and a passageway 100 having a horizontal leg in the top of the cap and a vertical leg extending downwardly in a side wall of the cap and terminating in an opening 102 in the lower compartment 44b.

The third port means 36c comprises the longitudinally extending grooves 62 leading from the lower compartment 44b to the downstream side of the valve body 12.

In the porting means 36, the hole 94 and openings 92 are of predetermined cross-sectional areas. The cross-sectional area of the aligned top holes 98 is larger than the cross-sectional area of the opening 92 into the upper compartment and the cross-sectional area of the passageway 100 is larger than the cross-sectional area of the aligned top holes. In a like manner, the cross-sectional area of the third port means 36c defined by the longitudinal groove 62 is larger than the cross-sectional area of the second port means 36b. In fact, within the porting means 36, the cross-sectional area of each exit port from any compartment or chamber within the valve actuator 14 is larger than the cross-sectional area of the entrance port to the same compartment or chamber. This means (1) that the compartments or chambers in the valve actuator 14, from the upstream to the downstream side of the valve, are at progressively lower fluid pressures and (2) that when the pilot valve means 34 is open, water flows through the first, second and third port means from the upstream to downstream side of the valve. Moreover, even when the pilot valve means 34 is closed, small quantities of fluid continuously bleed through the port means 36. Accordingly, during normal operation of the valve assembly 10, the upper compartment 44a is always at a higher pressure than the lower compartment 44b.

The porting means 36 also prevents sudden downstream increases from producing a pressure reversal across the rolling diaphragm 28. In particular, if the valve assembly is closed with the valve disc unit 66 seated on the valve seat 22, the port means 36 and upper and lower compartments 44a and 44b are filled with fluid and fluid is bleeding slowly from the lower compartment 44b to downstream of the valve through the grooves 62. Under such conditions, the occurrence of a pressure increase upstream produces a fluid force directed downstream at the valve and at the port means 36. Due to the relatively small cross-sectional area of the first port means 36a, the fluid in the upper compartment 44a is not permitted to rapidly escape therefrom. Therefore, since the fluid is incompressible, the fluid force is reflected both into the lower and upper compartments 44a and 44b and the relationship of the forces acting on opposite sides of the rolling diaphragm substantially maintained thereby preventing a reversal of and damage to the rolling diaphragm.

If the valve assembly is open and the pressure downstream suddenly increases, the valve disc unit 66 immediately moves to a closed position on the valve seat 22 with the rod 64 sliding downwardly within the tubular piston stem 50. Simultaneously, increased fluid force is transmitted to the lower compartment 44b and into the upper compartment 44a as just described to prevent the rolling diaphragm from being damaged. During this operation, it is to be noted that the valve means 32 acts as a check valve to automatically close and prevent downstream pressure surges from being reflected upstream to possibly damage equipment connected to the upstream line.

As previously indicated, the selective control of the pilot valve means 34 to open and close the porting means 36 provides means for selectively opening and closing the valve assembly 10. In each of the illustrated forms of the valve assembly, the pilot valve means 34 is adapted to selectively open and close a second port means 36b to block the flow of water from the upper compartment 44a to the lower compartment 44b. When the second port means 36b is closed, fluid pressure builds up in the upper compartment 44a to close the valve assembly. When the second port means is open, the upstream fluid forces on the valve means 32 opens the valve assembly.

In FIGURE 1, the valve assembly 10 is a normally closed valve and the pilot valve means 34 is an electrically controlled pilot valve unit comprising an upper chamber 104, a diaphragm 106, a needle valve 108, an armature 110, and a solenoid 112.

The upper chamber 104 is formed by the top of the cap 40 and a hollow metal case 114 connected to the top of the cap. Under the case 114, the top of the cap 40 includes an annular recess 116 around a vertical central hole 118. The recess 116 defines a valve seat 120 around the top of the central hole and communicates with the top holes 98, while the central hole 118 communicates with the passageway 100.

The metal case 114 includes a flat, generally cylindrical central portion 122 having an annular flange 124 extending outwardly from its lower end and a hollow cylinder 126 extending axially from its top face and closed at its upper end. The annular flange 124 is captured between the bottom of a retainer disc 128 and the top of an outer marginal edge 106a of the diaphragm 106, which is seated within an annular groove 130 in the top of the cap 40 below the retainer disc. The retainer disc is secured by nuts 132 to the top ends of the vertical screws 90 employed to hold the bracket disc 88 in place within the chamber 44.

The diaphragm 106 divides the upper chamber 104 into upper and lower sections 104a and 104b and is of a corrugated type including a relatively thin, concave, annular portion 106b between the relatively thick marginal edge 106a and a relatively thick, metal reinforced central portion 106c of the diaphragm. The lower surface of central portion 106c is adapted to seat on the valve seat 120 and includes a central opening 136 over the central hole 118 for receiving the tip end of the needle valve 108. The diaphragm 106 also includes a relatively small opening 138 in the annular portion 106b to allow fluid passing through the aligned top holes 98 into the lower section 104b to flow upwardly through the diaphragm into the upper section 104a. The fluid in the upper section 104a exerts a downward force on the diaphragm 106 which together with the downward force of the needle valve 108 causes the diaphragm to normally rest on the valve seat 120 with the tip of the needle valve closing the central opening 136 in the diaphragm.

In this regard, the tip of the needle valve 108 is connected to the lower end of the armature 110. The armature 110 extends upwardly into the top of the case 114 and is continuously urged toward the diaphragm 106 by a coil spring 140 bearing against the top of the armature and the closed top of the case.

When the diaphragm 106 is seated on the valve seat 120 and the needle valve 108 is closing the central opening 136, the pilot valve means 34 is said to be closed. The closed pilot valve means 34 blocks the second port means 36b and maintains the valve assembly closed with the valve means 32 on the valve seat 22.

The solenoid 112 is adapted to open the pilot valve means 34 and the valve assembly 10 by retracting the armature 110 and needle valve 108 from the diaphragm 106, allowing the diaphragm to move up from the valve seat 120.

The solenoid 122 is housed within a plastic case 142 having a central metal sleeve 144 adapted to fit over the top portion of the metal case 114. The plastic case 142 is removable from metal case 114 and capable of turning relative thereto. This permits the solenoid 112 to be held stationary with the turning of the cylinder 26 to raise and lower the lower end of the stem portion 46 toward and away from the valve seat 22, and prevents twisting of the wires connecting the solenoid to a power supply. This also permits the solenoid to be replaced without opening the inside of the valve actuator 14.

The solenoid case 142 is covered by a larger plastic cap 146 having outer sides adapted to snap onto the periphery of the retainer disc 128. The cap 146 shields the solenoid from the surrounding environment, and protects the electrical connection between the wiring from the associated power supply and the solenoid external to the solenoid case 142.

The design of pilot valve means 34 including the diaphragm 106 and solenoid 112 has several important features. First of all, it permits a relatively small, lightweight armature to effectively close a large port between the upper compartment and the lower compartment in the chamber 44. Secondly, the diaphragm and needle valve arrangement is self-closing to seal the passageway 110 in response to fluid pressure in the upper section 104a of the upper chamber 104 and the downward spring force on the armature 110. Thirdly, the diaphragm 106 permits transmittal of reverse fluid forces to the upper compartment of the chamber 44 in response to sudden increases in downstream pressure, to prevent a pressure reversal across the rolling diaphragm 28.

If a solenoid-controlled armature alone were utilized to open and close the second port means 36b, the armature would necessarily be quite large and require large amounts of electrical power to move from an open to closed position. The armature likewise resists reverse fluid forces during a high pressure surge downstream and could subject the rolling diaphragm 28 to a pressure reversal.

As indicated, the operation of the pilot valve means 34 controls the opening and closing of the valve assembly 10. In FIGURE 1, the pilot valve means 34 is normally closed to block the second port means 36b and the valve assembly is a normally closed valve. In this regard, with the pilot valve means 34 closed to block the second port means 36b, high pressure upstream fluid flows through the first port means 36a into the upper compartment 44a of the chamber 44. A portion of the fluid also flows upwardly through the top holes 98 into the lower section 104b of the upper chamber 104 and through the small hole 138 into the upper section 104a. The fluid pressure in the upper section 104a maintains the diaphragm 106 seated on the valve seat 120 with the needle valve 108 closing the central opening 136 in the diaphragm. As fluid continues to flow upwardly into the upper compartment 44a, fluid pressures are developed therein sufficient to force the piston 30 downwardly in the chamber 44 to seat the valve disc 66 on the valve seat 22 and thereby close the valve assembly 10.

The valve assembly 10 remains closed until such time as the solenoid 112 is actuated to open the pilot valve means 34 by retracting the armature 110 to move the needle valve 108 from the central opening 136 in the diaphragm 106. When the needle valve moves out of the opening 136, fluid from the upper section 104a of the upper chamber 104 flows through the central opening 136, the passageway 100, and the third port means 36c to downstream. As this occurs, the pressure below the diaphragm 106 becomes greater than the pressure above the diaphragm, and the diaphragm moves upwardly from the seat 120 permitting fluid to flow directly from the lower section 104b into passageway 110, and through the third port means to the downstream side of the valve body 12.

The opening of the pilot valve means 34 therefore permits the upper compartment 44a of the chamber 44 to exhaust to downstream such that the downward forces on the piston 30 become less than the upward forces on the bottom of the valve disc unit 66. As this occurs, the valve disc unit 66, together with the piston rod 58 and piston 30 move rapidly upward to the position illustrated in phantom outline, to open the valve assembly 10.

With the valve assembly 10 open, fluid continuously bleeds through the porting means 36 internally through the valve actuator 14 from the upstream to downstream sides of the valve body 14 to insure against a pressure reversal across the rolling diaphragm 28.

When it is desired to again close the valve assembly 10, the solenoid 112 is simply de-energized allowing the coil spring 140 to force the needle valve 108 into the central opening 136 in the diaphragm 106. Fluid pressure then rapidly builds up in the upper section 104a of the upper chamber 104 sufficient to force the diaphragm 106 downwardly against the valve seat 120. When this occurs, the second port means 36b is closed and fluid pressure increases rapidly in the upper compartment 44a to cause the piston 30 to move downward within the chamber 44. Downward movement of the piston 20 carries the valve means 32 onto the valve seat 22 and thereby closing the valve assembly 10.

As previously described, the ability of the valve means 32 to move independently of the tubular piston rod 48 is an important feature in that it permits the valve means to act as a check valve to prevent reversals in downstream pressure from being reflected upstream. In addition to this, the independent movability of the valve means 32 allows the valve assemblies 10 to be manually opened simply by turning the cylinder 26 relative to the valve body 12.

In particular, when the valve disc 66 is seated on top of the valve seat 22, rotation of the cylinder 26 relative to the valve body 12 causes the upper end of the stem portion 46 to engage the underside of the piston 30. Continued rotation of the cylinder 26 lifts the piston 30 and piston rod 58 upwardly with the cylinder. When this occurs, the upward forces acting on the lower face of the valve disc 66 are sufficient to raise the valve disc off of the valve seat 22 and to thereby open the valve assembly 10.

Also, in the valve assembly 10, the rate at which fluid passes through the open valve is determined in part by the distance between the valve disc 66 and the valve seat 22. This in turn is regulated by the distance which the end of the stem portion 46 extends into the valve body 12. The closer the end of the stem portion 46 to the valve seat 22, the closer the valve disc to the valve seat when the valve is open and the lower the rate of water flow through the valve. Thus, simply by turning the cylinder 26 and moving the end of the stem portion 46 toward and away from the valve seat 22, the rate of flow for the open valve may be selectively preset or manually adjusted during operation of the valve assembly.

In addition, by manually turning the cylinder 26 relative to the valve body 12, the end of the stem portion 46 may be brought into engagement with the upper portion of the valve disc 66 when seated on top of the valve seat 22. In this manner the valve assembly 10 may be manually shut off to insure against fluid flow through the valve regardless of the condition of the pilot valve means 34. Furthermore, and as previously discussed, by manually turning the cylinder 26 relative to the valve body 12, the valve assembly 10 may be manually opened to allow water to flow therethrough to the downstream side of the valve body.

It is to be noted that the manual adjustment of the flow rate through the valve, as well as the manual closing and opening of the valve assembly 10, is accomplished with a plastic cylinder 26. The use of the plastic cylinder in the valve assembly 10 materially reduces the cost of manufacturing the valve assembly. The use of the plastic cylinder also reduces servicing and maintenance costs, since the plastic is not subject to corrosion or electrolysis.

In the design of the present invention, plastic materials may be safely employed to form the cylinder 26 without fear of damage to the cylinder during operation or adjustment of the valve assembly. In particular, when the valve assembly is open, the upper surface of the valve disc 66 bears against the lower end of the stem portion 46 to place the stem portion in compression. The same is true when the valve assembly is manually adjusted to bring the valve disc 66 into engagement with the valve seat 22 to close the valve assembly. Under such conditions, a further turning of the cylinder simply increases the compression forces on the stem portion which are easily withstood by the plastic material.

Accordingly, the present invention provides an improved valve assembly which is specially designed to allow the use of plastic materials in the cylinder of the valve without fear of damage to the valve structure, thereby lowering the cost of manufacture and servicing of the valve assembly.

Not only is the valve assembly simpler in design and less expensive than conventional hydraulically or electrically actuated valves, but it is also extremely reliable, responds quickly to control, and closes slowly to eliminate water hammer and surge.

Furthermore, the valve actuator 14 of the valve assembly is adapted to fit any size of valve body 12 thereby allowing the actuator to be utilized as a separate unit for converting manually operated valves to electrically actuated manually controllable valves. In this regard, all that need be altered to utilize the basic valve actuator with any size valve is the proper selection of the adapter ring to fit the top port in the valve body and the proper selection of the valve disc to seat upon the valve seat within the valve body.

From the foregoing, it is appreciated that the valve assembly of the present invention includes all the advantages of piston and diaphragm-type valves without their associated disadvantages. This is accomplished in a simple, compact, packless valve assembly having linear operating characteristics.

While a particular form of valve assembly has been described in some detail herein, changes and modifications may be made in the illustrated form without departing from the spirit of the invention. It is therefore intended that the present invention be limited in scope only by the terms of the following claim.

I claim:

1. A valve assembly comprising:
  a valve body connected to a fluid line and having means defining a valve seat between upstream and downstream sides of said body and an internally threaded opening opposite and on a downstream side of said valve seat;
  a hollow cylinder including an upper head portion defining a cylindrical chamber and a lower externally threaded tubular stem portion adapted for hand screwing into and through said opening in said valve body for movement toward and away from said valve seat to regulate the distance between a lower end of said tubular stem portion and said valve seat;
  a piston in said chamber;
  a piston rod mounted for longitudinal sliding movement in said tubular stem portion and connected to said piston to support said piston for vertical movement in said chamber spaced from inner side walls thereof;
  sealing means between a periphery of said piston and said inner side walls of said chamber comprising a tubular and flexible diaphragm member having one end of relatively small diameter and an opposite end of relatively large diameter, means sealing said one end to a circumferential marginal edge portion of said piston to close said one end, and means sealing said opposite end to said inner side walls of said chamber above said piston to close said opposite end and to divide said chamber into upper and lower compartments such that a main body portion of said diaphragm member between said one and opposite ends is supported at all times with a slack therein by said inner side walls of said chamber and an outer axial surface of said piston as said piston travels vertically in said chamber;
  valve means extending from said piston rod in said valve body for seating on said valve seat to close said valve, said valve means being movable with said piston between said valve seat and said lower end of said tubular stem portion whereby said lower end limits movement of said valve means away from said valve seat;
  means for automatically actuating said valve including
    first port means continually passing upstream fluid to said upper compartment,
    second port means having an outlet of greater cross sectional area than said first port means for passing fluid from said upper compartment to said lower compartment,
    third port means having an outlet of greater cross sectional area than said second port means for passing fluid of said lower compartment to said downstream side of said valve body,
    second valve seat means in said second port means,
    a laterally flexible and resilient diaphragm means including a central opening,
    means around said second valve seat means for supporting said diaphragm means to extend across said second valve seat means for movement of a central portion of said diaphragm means toward and away from said second valve seat means with changes and pressure across said diaphragm means,
    means for porting fluid from upstream of said valve body to a first side of said diaphragm means remote from said second valve seat means including a relatively small opening in said diaphragm means radially spaced from said central opening, and
    selectively operable means for regulating the flow of fluid to said first side of said diaphragm means to control the pressure thereacross and hence movement of said diaphragm means toward and away from said second seat means to open and close said second port means, said selectively operable means including a needle valve on said first side of said diaphragm means for closing said central opening, spring means for urging said needle valve against said diaphragm means and into said central opening, and solenoid means around said needle valve for retracting said needle valve from said diaphragm means to open said valve assembly; and means supporting said solenoid means for turning relative to said needle valve whereby said solenoid means may remain stationary upon a turning of said hollow cylinder to adjust the distance between said lower end of said tubular stem portion and the first-mentioned valve seat in said valve body.

References Cited

UNITED STATES PATENTS

| | | | |
|---|---|---|---|
| 975,915 | 11/1910 | Wilkins | 251—61.4 |
| 3,112,094 | 11/1963 | Nees | 251—46 X |
| 3,172,420 | 3/1965 | Brown | 251—43 X |
| 3,253,615 | 5/1966 | Armstrong | 251—46 X |
| 3,315,696 | 4/1967 | Hunter | 251—63 X |

FOREIGN PATENTS

| | | |
|---|---|---|
| 395,496 | 12/1908 | France. |
| 642,360 | 6/1962 | Canada. |

ALAN COHAN, Primary Examiner

U.S. Cl. X.R.

251—46